(12) United States Patent
Medla et al.

(10) Patent No.: US 11,326,958 B2
(45) Date of Patent: May 10, 2022

(54) PROTECTIVE ISOLATING MODULE FOR AN ELECTRICAL MACHINE

(71) Applicant: Siemens Aktiengesellschaft, Munich (DE)

(72) Inventors: Norbert Medla, Röttenbach (DE); Felix Butz, Schweinfurt (DE); Michael Wöhning, Hofheim (DE)

(73) Assignee: WEISS SPINDELTECHNOLOGIE GMBH, Maroldsweisach (DE)

( * ) Notice: Subject to any disclaimer, the term of this patent is extended or adjusted under 35 U.S.C. 154(b) by 0 days.

(21) Appl. No.: 17/272,087

(22) PCT Filed: Aug. 14, 2019

(86) PCT No.: PCT/EP2019/071810
§ 371 (c)(1),
(2) Date: Feb. 26, 2021

(87) PCT Pub. No.: WO2020/043492
PCT Pub. Date: Mar. 5, 2020

(65) Prior Publication Data
US 2021/0325255 A1    Oct. 21, 2021

(30) Foreign Application Priority Data

Aug. 31, 2018 (EP) .................................... 18192046

(51) Int. Cl.
*G01K 13/00* (2021.01)
*G01K 1/02* (2021.01)
*H02P 29/60* (2016.01)

(52) U.S. Cl.
CPC ............... *G01K 1/02* (2013.01); *H02P 29/60* (2016.02); *G01K 2215/00* (2013.01)

(58) Field of Classification Search
CPC combination set(s) only.
See application file for complete search history.

(56) References Cited

U.S. PATENT DOCUMENTS

2006/0242350 A1* 10/2006 Worley ................ H04B 10/801
710/305
2010/0254443 A1* 10/2010 Scharrer ........... H02M 3/33515
375/220

(Continued)

FOREIGN PATENT DOCUMENTS

CN         104121933 A   * 10/2014
DE  10 2007 039 951 A1    2/2009

(Continued)

OTHER PUBLICATIONS

PCT International Search Report and Written Opinion of International Searching Authority dated Dec. 3, 2019 corresponding to PCT International Application No. PCT/EP2019/071810 filed Aug. 14, 2019.

*Primary Examiner* — Lisa M Caputo
*Assistant Examiner* — Nasir U. Ahmed
(74) *Attorney, Agent, or Firm* — Henry M. Feiereisen LLC

(57) ABSTRACT

An electric machine includes a protective isolation module which is accommodated in a machine housing. The protective isolation module includes an input interface which is electrically connected to a temperature sensor to receive an electrical sensor signal generated by the temperature sensor as a measure of a machine temperature of the electric machine, an output interface which is galvanically isolated from the input interface to realize a secure electrical protective isolation of the output interface from a voltage flashover of a machine winding in the sensor power circuit, and a supply interface, via which the protective isolation module can be supplied with electrical energy from a power supply for the electric machine. An electronic control system receives an output signal that replicates the sensor signal via (Continued)

the output interface for evaluation in the electronic control system.

15 Claims, 2 Drawing Sheets

(56) References Cited

U.S. PATENT DOCUMENTS

| | | | |
|---|---|---|---|
| 2012/0001002 A1* | 1/2012 | Donaldson | A47J 43/087 241/36 |
| 2013/0181694 A1* | 7/2013 | Volent | G01D 21/00 323/311 |
| 2014/0023110 A1 | 1/2014 | Hamanaka et al. | |
| 2014/0346987 A1* | 11/2014 | Becker | H02P 6/085 318/400.21 |
| 2015/0063417 A1 | 3/2015 | Jeong et al. | |

FOREIGN PATENT DOCUMENTS

| | | |
|---|---|---|
| DE | 10 2014 203 509 A1 | 8/2015 |
| DE | 10 2017 111 767 A1 | 11/2017 |

\* cited by examiner

PROTECTIVE ISOLATING MODULE FOR AN ELECTRICAL MACHINE

CROSS-REFERENCES TO RELATED APPLICATIONS

This application is the U.S. National Stage of International Application No. PCT/EP2019/071810, filed Aug. 14, 2019, which designated the United States and has been published as International Publication No. WO2020/043492 A1 and which claims the priority of European Patent Application, Serial No. 18192046.3, filed Aug. 31, 2018, pursuant to 35 U.S.C. 119(a)-(d).

BACKGROUND OF THE INVENTION

The invention relates to a protective isolation module for an electric machine that has at least one temperature sensor for generating an electrical sensor signal as a measure of a machine temperature of the electric machine.

In order to monitor the machine temperature of an electric machine, an electrical or electronic temperature sensor is frequently used, which is installed in a machine winding of the electric machine. In the event of a fault, a voltage flashover from the machine winding to the power circuit may take place, which causes an overvoltage in the power circuit of the temperature sensor.

From DE 10 2014 203 509 A1, a control device for actuating an electric motor is known, which has at least one temperature sensor that records a motor temperature. The control device has a motor temperature measuring facility, which has an oscillator for generating an oscillator signal, a transformer with a primary winding and a secondary winding galvanically isolated from the primary winding, wherein the oscillator signal is applied to the primary winding. A sensor actuation signal generating facility is embodied to generate a sensor actuation signal from a signal present at the secondary winding. Furthermore, a temperature sensor connection is provided, at which the sensor actuation signal is output and which is provided for connecting to the temperature sensor. An evaluation facility is embodied to evaluate a current flowing through the primary winding and/or a voltage present at the primary winding to measure the motor temperature.

The invention is based on the object of reducing danger for operators and peripheral equipment of an electric machine which may be caused by overvoltages in a power circuit of a temperature sensor installed in the electric machine.

SUMMARY OF THE INVENTION

The object is achieved according to the invention by a protective isolation module as set forth hereinafter.

Advantageous embodiments of the invention are the subject matter of the dependent claims.

A protective isolation module according to the invention is provided for an electric machine which has a machine housing and at least one temperature sensor for generating an electrical sensor signal as a measure of a machine temperature of the electric machine. The protective isolation module can be built into the machine housing and has an input interface, which can be electrically connected to the at least one temperature sensor to receive the sensor signals generated by the temperature sensor, and an output interface, which is galvanically isolated from the input interface. An output signal that replicates the sensor signal is output via the output interface for each sensor signal received by the input interface.

The protective isolation module makes it possible to output, via the output interface, output signals that replicate the sensor signals of the at least one temperature signal. By galvanically isolating the input interface from the output interface, the output interface is securely electrically isolated from possible voltage flashovers from the machine winding of the electric machine into the sensor power circuit of the temperature sensor. Due to the output signals output by the output interface replicating the sensor signals, electrical connecting elements conventionally used for reading the sensor signals, such as cables and plugs, may also be used for reading the output signals, so that no specific connecting elements are required. The protective isolation module is therefore transparent for a user of the electric machine, i.e. the user may use the electric machine as they would a conventional electric machine that does not have the protective isolation module, without needing additional external components or having to perform further measures.

One embodiment of the invention provides that the protective isolation module has at least one optocoupler for galvanically isolating the input interface and the output interface and for transferring signals between the input interface and the output interface. An optocoupler makes it possible to optically transfer an electrical signal between galvanically isolated power circuits and is therefore suitable, in a particularly advantageous manner, for transferring a sensor signal from the input interface to the output interface of the protective isolation module while the two interfaces are galvanically isolated.

As an alternative or in addition, the protective isolation module may have at least one electronic circuit for galvanically isolating the input interface and the output interface and for transferring signals between the input interface and the output interface.

A further embodiment of the invention provides that the protective isolation module has a supply interface, via which the protective isolation module can be supplied with electrical energy from a power supply of a rotary encoder for the electric machine. This embodiment of the invention makes use of the fact that many electric machines can be connected to rotary encoders, and makes it possible to supply the protective isolation module with electrical energy from the power supply of a rotary encoder for the electric machine. As a result, no separate or additional voltage supply is needed for the protective isolation module.

A further embodiment of the invention provides that the input interface of the protective isolation module has inputs for various kinds of temperature sensors. As a result, the protective isolation module can advantageously be used for various kinds of temperature sensors and therefore can be used in a flexible manner.

An electric machine according to the invention comprises a machine housing, at least one temperature sensor, in particular at least one temperature sensor installed in a machine winding of the electric machine, for generating an electrical sensor signal as a measure of a machine temperature of the electric machine and a protective isolation module according to the invention arranged in the machine housing, the input interface of which is electrically connected to the at least one temperature sensor. The advantages of an electric machine of this kind correspond to the advantages already mentioned above of a protective isolation module according to the invention and for this reason are not repeated again here.

A motor spindle according to the invention has an electric motor, which is embodied as an electric machine according to the invention. Motor spindles frequently have a particularly compact design and are operated at high power ratings. For this reason, the motor of a motor spindle as a rule has to be sufficiently cooled and its motor temperature has to be monitored, in order to prevent an overheating of the motor. For this reason, electric motors of motor spindles frequently have temperature sensors for monitoring the motor temperatures. An electric machine according to the invention is therefore suitable as an electric motor for a motor spindle in particular.

BRIEF DESCRIPTION OF THE DRAWING

The above-described characteristics, features and advantages of this invention, as well as the manner in which these are realized, will become more clearly and easily intelligible in connection with the following description of exemplary embodiments which are explained in more detail with reference to the drawings, hi which.

DETAILED DESCRIPTION OF PREFERRED EMBODIMENTS

Figure 1:
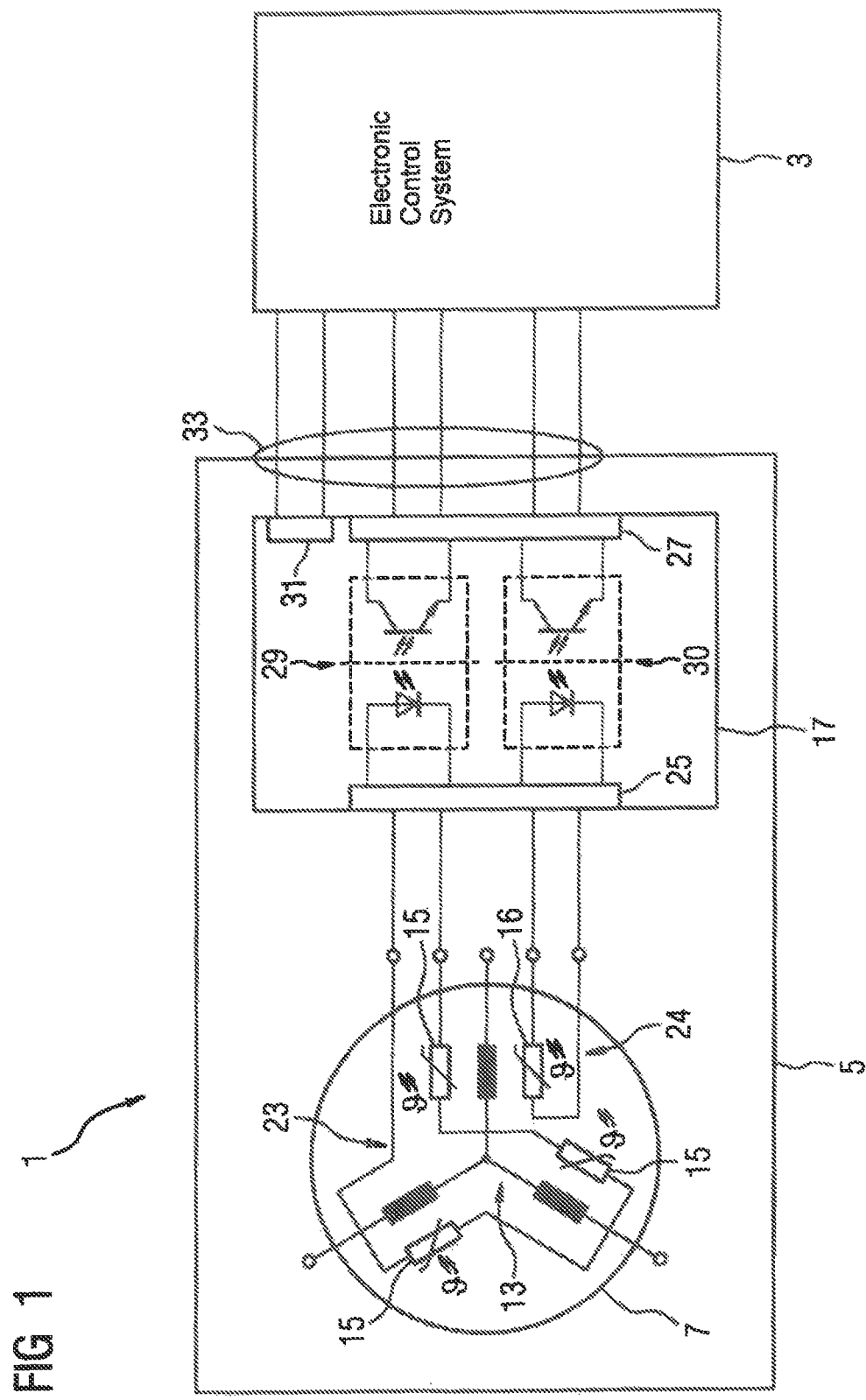
FIG. 1 shows a block diagram of an electric machine connected to an electronic control system.

Parts which correspond to one another are provided with the same reference characters in the figures.

Figure 2:
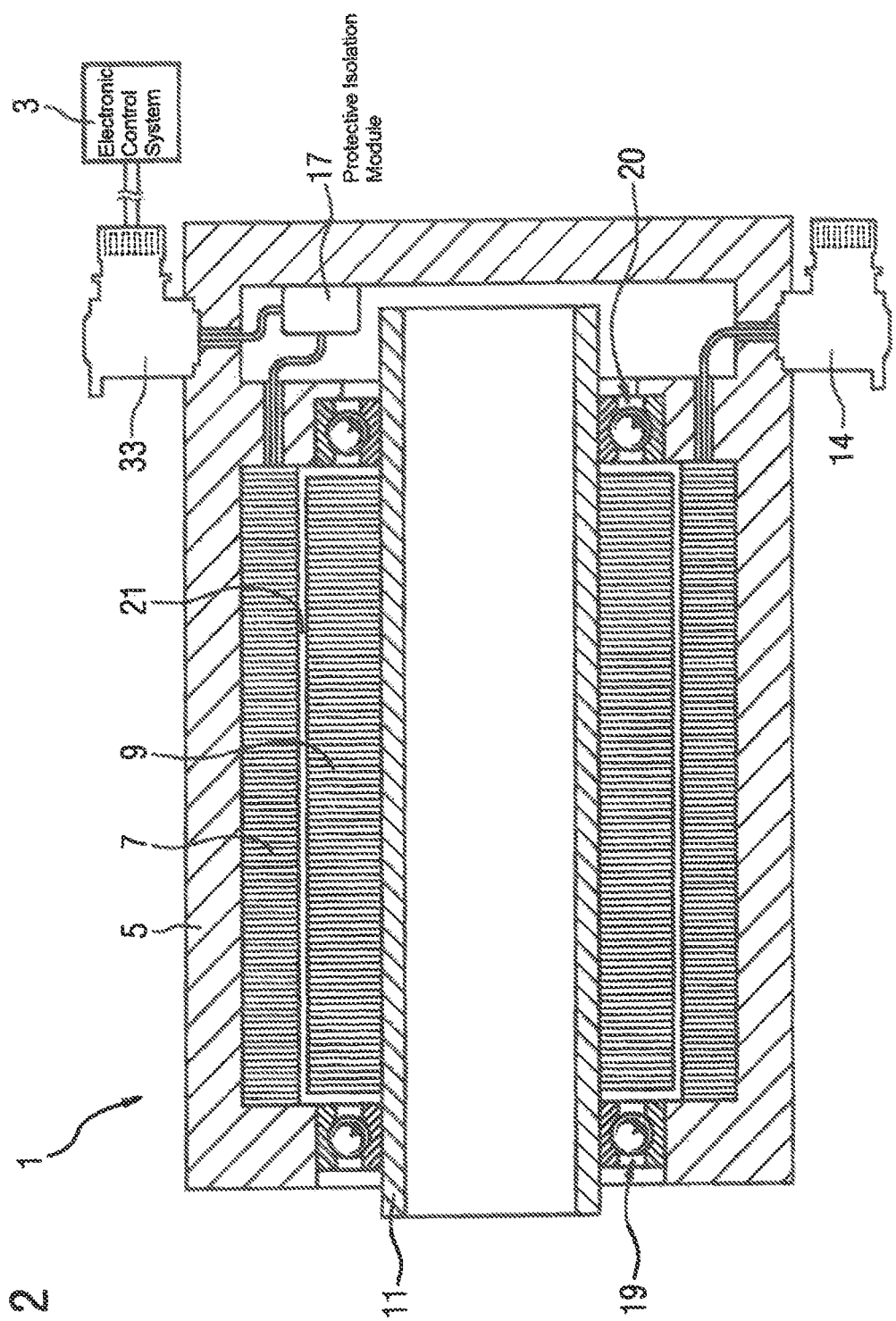
FIG. 2 shows a sectional representation of an electric machine.

FIGS. 1 and 2 show an exemplary embodiment of an electric machine 1 according to the invention. FIG. 1 shows a block diagram of the electric machine 1; FIG. 2 shows a sectional representation of the electric machine 1. FIG. 1 also shows an electronic control system 3, to which the electric machine 1 is connected.

The electric machine 1 has a machine housing 5, a stator 7, a rotor 9, a machine shaft 11, a three-phase machine winding 13, temperature sensors 15, 16 and an exemplary embodiment of a protective isolation module 17 according to the invention. The electric machine 1 is embodied as an electric motor of a motor spindle for example, the spindle shaft of which is the machine shaft 11.

The stator 7, the rotor 9 and the protective isolation module 17 are arranged in the machine housing 5. The machine shaft 11 protrudes out from the machine housing 5 and is rotatably mounted on the machine housing 5 by way of two shaft bearings 19, 20. The rotor 9 runs annularly around the machine shaft 11 and is rigidly connected to the machine shaft 11. The stator 7 has a laminated core, which is arranged annularly around the rotor 9 such that it is spaced apart from the rotor 9 by an air gap 21 and which has grooves (not shown in any further detail), through which the machine winding 13 runs. The machine winding 13 is connected to a power connection 14 of the electric machine 1.

The temperature sensors 16, 16 are embodied as electrical or electronic sensors for generating electrical sensor signals as a measure of a machine temperature of the electric machine 1 and are installed in the machine winding 13. In the exemplary embodiment shown, three first temperature sensors 15 of the same kind are arranged in a common first sensor power circuit 23. A further temperature sensor 18 is arranged in a second sensor power circuit 24. The first temperature sensors 15 differ from the second temperature sensor 16, for example with regard to their measuring range.

For example, the temperature sensors 15, 16 each have a temperature-dependent electrical resistor, wherein the rated value of the electrical resistors of the first temperature sensors 15 differ from the rated value of the electrical resistor of the second temperature sensor 16.

The protective isolation module 17 has an input interface 25 electrically connected to both sensor power circuits 23, 24 for receiving the sensor signals generated by the temperature sensors 15, 16 and an output interface 27 galvanically isolated from the input interface 25. The protective isolation module 17 is embodied, for each sensor signal received by the input interface 25, to generate an output signal replicating the sensor signal and to output said out signal via the output interface 27. To galvanically isolate the input interface 25 and the output interface 27, and to generate the output signals from the sensor signals received by the input interface 25, the protective isolation 17 has, for each sensor power circuit 23, 24, an optocoupler 29, 30 that connects the input interface 25 to the output interface 27 and generates the respective output signal and transfers it to the output interface 27, Instead of optocouplers 29, 30, other assemblies, such as electronic circuits for example, may also be provided for galvanically isolating the input interface 25 and the output interface 27 and for transferring signals between the input interface 25 and the output interface 27.

The protective isolation module 17 furthermore has a supply interface 31, via which it can be supplied with electrical energy, in particular, the protective isolation module 17 may be supplied with electrical energy from a power supply of a rotary encoder for the electrical machine 1. The output interface 27 and the supply interface 31 are electrically connected to a connection unit 33 of the electric machine 1, via which the electric machine 1 can be electrically connected to the electronic control system 3. The electronic control system 3 is in particular embodied to read and evaluate the output signals output by the output interface 27 via the connection unit 33.

The protective isolation module 17, due to the galvanic isolation of the input interface 25 from the output interface 27, enables a secure electrical protective isolation of the output interface 27 from possible voltage flashovers from the machine winding 13 into the sensor power circuits 23, 24. Due to the output signals output by the output interface 27 replicating the sensor signals, electrical connecting elements conventionally used for reading the sensor signals, such as cables and plugs, may also be used for reading the output signals output by the output interface 27, so that no specific connecting elements are required.

The protective isolation module 17 is therefore transparent for a user of the electric machine 1, i.e. the user may use the electric machine 1 as they would a conventional electric machine that does not have the protective isolation module.

Although the invention has been illustrated and described in detail based on preferred exemplary embodiments, the invention is not restricted by the examples given and other variations can be derived therefrom by a person skilled in the art without departing from the protective scope of the invention.

The invention claimed is:

1. An electric rotary machine, comprising:
a machine housing;
a stator having a machine winding, a rotor and a protective isolation module accommodation in the machine housing;

a temperature sensor disposed proximate to the machine winding and configured to generate an electrical sensor signal as a measure of a machine temperature of the electric machine;

said protective isolation module including an input interface electrically connected to the temperature sensor to receive the sensor signal generated by the temperature sensor, an output interface galvanically isolated from the input interface and supplying an output system that replicates the sensor signal to an electronic control system. and a supply interface configured to supply the protective isolation module with electrical energy from a power supply for the electric machine, an electronic control system receiving the output signal and configured to read out and evaluate the output signal; and a connection unit for electrically connecting the output interface and the supply interface of the protective isolation module to the electronic control system; wherein electrical connections of the output interface replicate electrical connections of the input interface which eliminates a requirement for a specific connecting element when reading the output signal from the protective isolation module instead of the sensor signal directly from the temperature sensor.

2. The electric rotary machine of claim 1, wherein the electronic control system is configured to read and evaluate the output signal output by the output interface via the connection unit.

3. The electric rotary of claim 1, further comprising an optocoupler configured to galvanically isolate the input interface and the output interface and to implement a signal transfer between the input interface and the output interface.

4. The electric rotary machine of claim 1, further comprising an electronic circuit configured to galvanically isolate the input interface and the output interface and to implement a signal transfer between the input interface and the output interface.

5. The electric rotary machine of claim 1, further comprising a rotary encoder for supplying electrical energy to the protective isolation module.

6. The electric rotary machine of claim 1, wherein the electric rotary machine comprises a plurality of temperature sensors, with at least one of the plurality of temperature sensors having a different measuring range than a rest of the plurality of temperature sensors.

7. The electric rotary machine of claim 1, wherein the protective isolation module is designed transparent for a user of the electric machine, so that the electric machine is useable like a conventional electric machine that does not have the protective isolation module.

8. A motor spindle, comprising an electric motor embodied as an electric rotary machine which comprises a machine housing, a stator having a machine winding, a rotor and a protective isolation module accommodated in the machine housing, a temperature sensor disposed proximate to the machine winding and configured to generate an electrical sensor signal as a measure of a machine temperature of the electric machine, said protective isolation module arranged inside the spindle and including an input interface electrically connected to the temperature sensor to receive the sensor signal generated by the temperature sensor, an output interface galvanically isolated from the input interface and supplying an output signal that replicates the sensor signal to an electronic control system, and a supply interface configured to supply the protective isolation module with electrical energy from a power supply for the electric machine, an electronic control system receiving the output signal and configured to read out and evaluate the output signal; and a connection unit for electrically connecting the output interface and the supply interface of the protective isolation module to the electronic control system, wherein electrical connections of the output interface replicate electrical connections of the input interface which eliminates a requirement for a a specific connecting element when reading the output signal from the protective isolation module instead of the sensor signal directly from the temperature sensor.

9. The motor spindle of claim 8, wherein the electronic control system is configured to read and evaluate the output signal output by the output interface via the connection unit.

10. The motor spindle of claim 8, wherein the electric rotary machine includes an optocoupler configured to galvanically isolate the input interface and the output interface and to implement a signal transfer between the input interface and the output interface.

11. The motor spindle of claim 8, wherein the electric rotary machine includes an electronic circuit configured to galvanically isolate the input interface and the output interface and to implement a signal transfer between the input interface and the output interface.

12. The motor spindle of claim 8, wherein the electric rotary machine includes a rotary encoder for supplying electrical energy to the protective isolation module.

13. The motor spindle of claim 8, wherein the input interface has inputs for a plurality of temperature sensors.

14. The motor spindle of claim 8, wherein the temperature sensor is installed in the machine winding.

15. The motor spindle of claim 8, wherein the protective isolation module is designed transparent for a user of the electric machine, so that the electric machine is useable like a conventional electric machine that does not have the protective isolation module.

\* \* \* \* \*